Patented July 23, 1935

2,009,274

UNITED STATES PATENT OFFICE 2,009,274

METHOD OF PRODUCING A BAKING AGENT

Carl Gerhard Quaschning and Heinrich Hundertmark, Hamburg, Germany, assignors to firm "Deback" Deutsche Backmittel Gesellschaft mit beschränkter Haftung, Hamburg, Germany No Drawing. Application May 25, 1933, Serial No. 672,902

6 Claims. (Cl. 99—10)

The invention relates to a baking agent in particular for the production of dark varieties of bread.

Bread has already been produced for example by milling meal to the extent of 60% to fine meal, making a paste with the bran and water, and heating this on a water bath or breaking it down in an autoclave with superheated steam, thereupon drying the material at a temperature corresponding to the baking temperature, namely about 230 to 250° C. and milling the product to fine meal. Then to the 60 parts of fine meal the leaven was added and then the remaining broken down meal admixed with the usual ingredients, the whole converted into a dough and baked in the usual manner to bread.

Obviously, this process did not fulfill the hopes entertained since it was proposed to improve this manner of operation by stirring the bran with water to a dough, then to form this into lumps, and bake these at the baking temperature to dry and to mill the same finely. The bran so converted was then added to the bread dough.

Finally it has been attempted to improve the breaking up of the bran by sugaring it with diastase-containing material such as malt.

It has now been found that a considerable improvement of this process and its results can be obtained if the bran is stirred with water to a thin dough, converted or broken down by heating for about 2 to 10 minutes to a temperature which is at the most 180° C., dried, milled and if requisite sifted.

*Example.*—1 part of rye bran is stirred to a thin paste with about 3 parts of water, allowed to swell somewhat and the paste thereupon for a short time, about 2 to 10 minutes, heated in thin layers on a roller dryer heated with steam of about 5 atmospheres pressure above amospheric. It is in all circumstances to be avoided that higher temperatures, for example such as 230 to 250° C. which arise in baking ovens, are employed, since by these the product, as has been shown, suffers.

The dried product is milled and if required sieved.

For the production of a black bread the process may for example be as follows:

1000 grams of coarse rye meal are admixed with 50 grams of leaven and 600 grams of water, and employed for the raising of the dough. Thereupon a further 800 grams of coarse rye meal, 30 grams of cooking salt and a further 900 grams of water are added and 200 grams of the broken down or converted bran according to the present invention is added. The whole is worked up into a dough which, after a dough ripening (Ger. Teiggane) of about 60 minutes and a final ripening (Ger. Endgane) of about 15 minutes, is placed in the oven and baked in the usual manner. The weight of the dough 3580 grams and the dough yield about 176%.

If, on the other hand, a bran treated according to the hitherto known processes at a temperature of 230 to 250° C. is used, then a dough yield of about 168% results. The yield according to the present invention is thus about 8% higher. Obviously the splitting up at high temperatures above 200° is too strong, so that mainly the properties of the bran which are important for the baking capacity are deteriorated or constituents of the bran are destroyed.

We claim:—

1. Process for the manufacture of bread, which includes the steps of mixing bran with water, heating said mixture to a temperature between 90° C. and 180° C. for a period not exceeding ten minutes, drying the product, milling the same and incorporating the milled product with dough made of normal bread-making constituents.

2. Process for the manufacture of bread which includes the steps of incorporating bran with water, heating said mixture to a temperature not exceeding 180° C. for a period not exceeding 10 minutes, drying the product, milling the same and incorporating the milled product in a bread-making dough of normal character.

3. Process for making bread which includes the steps of mixing 1 part of bran with 3 parts of water, treating the same at a temperature in excess of 90° C. but not exceeding 180° C. for approximately 5 minutes, drying the product and milling the same and mixing the milled product with bread-making dough of normal characteristics.

4. Process for making bread which includes the steps of mixing bran with water to a thin paste, treating said paste on a heated roller dryer to a temperature not exceeding 180° C. for a period not exceeding ten minutes drying and milling the product and mixing the same with a bread dough of normal constitution.

5. Process for the manufacture of dark coloured bread which includes the step of incorporating a bran subjected in the form of a thin paste with water to a short heat treatment at a temperature above 90° C. but not exceeding 180° C. and in the form of a milled product in dough.

6. Process for making rye bread which includes the step of mixing rye bran with water to a thin paste, subjecting the said paste in thin layers to a heat treatment not exceeding 180° C. for a short time, drying the product, milling the same and mixing the milled product with a rye dough.

CARL GERHARD QUASCHNING.
HEINRICH HUNDERTMARK.